Oct. 31, 1967
R. A. GRAGSON 3,349,758
PRECOMBUSTION CHAMBER DEVICE
Filed Aug. 19, 1965
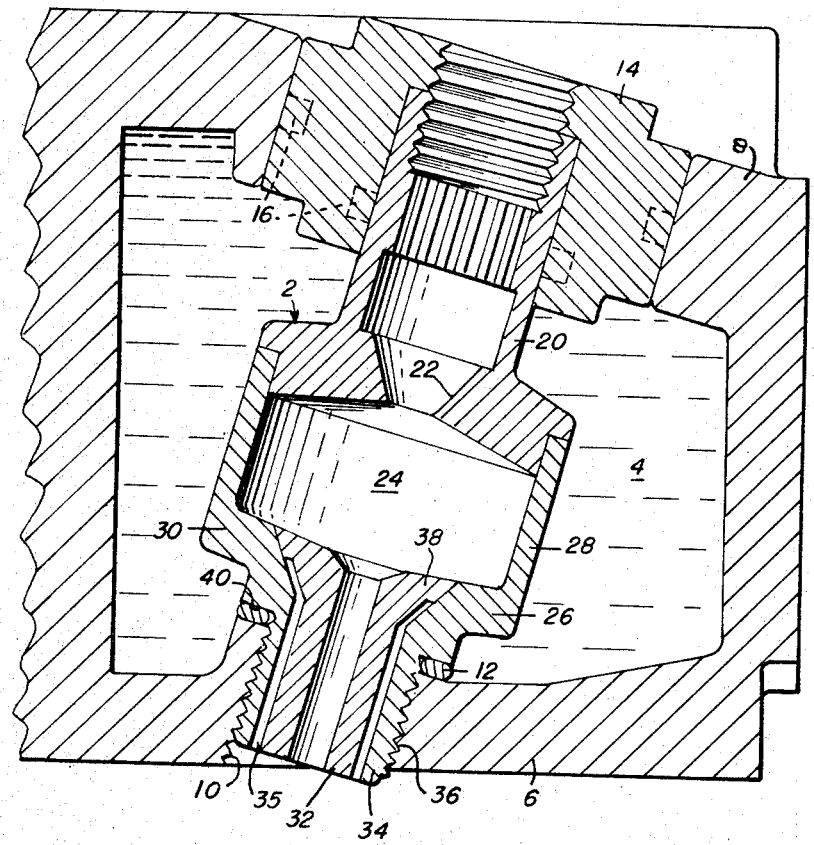
INVENTOR
ROBERT A. GRAGSON
BY Beale and Jones
ATTORNEYS

United States Patent Office 3,349,758
Patented Oct. 31, 1967

3,349,758
PRECOMBUSTION CHAMBER DEVICE
Robert Anthony Gragson, 200 Jeanne Drive,
Las Vegas, Nev. 89108
Filed Aug. 19, 1965, Ser. No. 481,132
11 Claims. (Cl. 123—32)

ABSTRACT OF THE DISCLOSURE

A precombustion chamber device having an inlet for receiving fuel, a preferably cylindrical precombustion chamber, and an outlet for the precombustion products. The outlet comprises a pair of concentric radially spaced, tubular extension members, the outermost member being externally threaded for insertion in a cylinder head. The innermost member forms an outlet conduit, and its upper end is outwardly flared for attachment to the wall of the precombustion chamber to act as a barrier between the chamber and the space between the two tubular members.

Field of the invention

This invention relates to an improvement in the construction of precombustion chamber devices such as those customarily used in internal combustion engines of the compression ignition type. Particularly, the precombustion chamber device of this invention is one which is designed so that it may easily be mounted in diesel engines of conventional construction and will alleviate cracking of engine heads which has been experienced with prior art devices.

Description of the prior art

Compression ignition engines have long been known in the art. In such engines, the fuel-air mixture is ignited by subjecting it to very high pressure rather than using a spark ignition device such as a spark plug. A well known element of compression ignition engines is a precombustion chamber device, and it is to such a device that this invention is directed.

A precombustion chamber is a chamber which lies intermediate and in communication with the engine cylinder and the fuel injector. The volume within a precombustion chamber is relatively small when contrasted to the volume of the engine cylinder. In the normal engine cycle, during the compression stroke of a piston, gases are forced into the precombustion chamber. These gases are relatively hot due both to the high degree of compression and the heat within the cylinder. Before the piston reaches its uppermost point of travel, the fuel injector sprays an atomized measured quantity of fuel into the precombustion chamber. The heat and pressure of the air combined with the fuel initiates a minor explosion in the precombustion chamber to consume a small percentage of the fuel. This explosion generates additional heat which vaporizes the fuel in the chamber and promotes its expulsion into the engine cylinder. The vaporization of the fuel and the heat generated by the explosion in the precombustion chamber contribute materially to the efficiency of the engine and to the main ignition of the fuel which takes place within the engine cylinder itself.

Normally, the precombustion chamber device has a tubular outlet which is threaded into the cylinder head of the engine. It is through this outlet that the hot gases enter the precombustion chamber, and also through it that the partially exploded vaporized mixture exits the precombustion chamber. Thus, this outlet member is exposed to a substantial quantity of heat. This heat causes expansion of the metal in the vicinity of the outlet. Experience has shown that extended use will cause this expansion to crack the wall of the cylinder head and necessitate its replacement.

Summary of the invention

It is an object of this invention to alleviate the problem of cylinder head cracking which has existed in prior art devices. This object is satisfied by the present invention in which there is an exterior tubular member which surrounds the outlet conduit of the precombustion chamber. This exterior tubular member lies firmly within and engages an opening in the wall of the engine's cylinder head. There is a spacing between the outlet conduit and the threaded tubular member which prevents the highly localized heating adjacent the head which leads to the cracking of the engine head. It is to be noted that this particular object is satisfied without sacrificing the advantage of conveniently threading the precombustion chamber device into the wall of the cylinder head.

In providing the aforementioned spacing between the precombustion chamber's outlet and the surrounding tubular member, it will be recognized that the outlet conduit will remain at a substantially higher temperature than if it were in threaded engagement with the wall of the cylinder head. Having this higher temperature, the outlet will not take as much heat from the incoming and outflowing gases. Thus, these gases will remain at a higher temperature. This is believed to contribute, at least to some degree, to the efficiency of the engine. This, however, is only a collateral advantage which results from the particular structure claimed herein.

Essentially, the objects of this invention are achieved by a precombustion chamber device capable of use with an internal combustion engine and comprising, walls defining an enclosed precombustion chamber, one of which has an inlet to the precombustion chamber for connection to a fuel injecting device. There are a pair of concentric tubular members attached to another one of the walls of the chamber and these extend outwardly from the chamber and are spaced apart radially to define an annular space therebetween. The innermost of these tubular members has its central bore in fluid communication with the precombustion chamber. Barrier means are spaced inwardly of the outermost end of the tubular members to close off direct fluid communication between the precombustion chamber and the above-mentioned annular space.

Brief description of the drawing

Of course, the improved precombustion chamber device may assume various forms. A preferred embodiment is disclosed herein, and from it one may understand the general principle of construction and mode of operation of this invention.

The single figure of the drawing discloses a representative precombustion chamber device mounted within the cylinder head of an internal combustion engine and employing the new and useful structure of my invention.

Description of the preferred embodiment

The precombustion chamber device, generally designated 2, is shown mounted within the cylinder head of a conventional engine. The cylinder head has therewithin a water jacket 4 which is enclosed by a lower wall 6, an upper wall 8 and side walls. The lower end of the precombustion chamber device is threadedly engaged within an opening 10 in the lower wall 6. A gasket 12 of suitable heat and water-resistant material facilitates sealing between the precombustion chamber device 2 and lower wall 6. Surrounding the upper end of the precombustion chamber device, there is a block-like member 14 slidably fitted thereon and provided with gaskets 16 which prevent leakage of the water or other coolants from the water jacket.

As illustrated, the precombustion chamber device 2 may be made in two sections. The uppermost section includes an inlet conduit 20 which is interiorly threaded at its upper end for reception of a standard fuel injection device. An inwardly tapered portion 22 opens to the enclosed chamber 24 which is the precombustion chamber itself. Throughout this specification the term "precombustion chamber device" has been used to describe the overall assembly 2, while "precombustion chamber" means the cavity 24 within the device. The lower section 26 of the precombustion chamber device includes a cylindrical side wall 28 and a bottom wall 30 which define in part the precombustion chamber 24. A pair of concentric tubular extension members 32 and 34 extend downwardly from the precombustion chamber 24. These are preferably of annular cross-sectional shape. The innermost of these members 32 constitutes the tubular outlet conduit from the precombustion chamber 24. The larger and outermost of these extension members 34 surrounds the outlet conduit 32 and it is exteriorly threaded at 36. It will be noted that the members 32 and 34 are spaced apart radially throughout the threaded portion of the member 34. This presents an annular space 35 which serves to prevent heat transfer by conduction between the respective tubular members 32 and 34. The outlet conduit 32 has toward its upper end an outwardly flared portion 38 which is attached to the wall 30 of the chamber by welding or other suitable means. A threaded interconnection may be used. The flared portion 38 acts as a barrier between the precombustion chamber 24 and the annular space 35 which lies between the members 32 and 34. Thus, there is no direct fluid communication between the precombustion chamber 24 and the annular space.

Adjacent the uppermost terminus of the tubular member 34, there is provided a shoulder on the exterior of bottom wall 30 of the precombustion chamber device. This shoulder has a planar face 40 which surrounds and lies in a plane radial to the threaded tubular member 34. As shown in the drawing, this shoulder is designed to act as a compressive surface upon the gasket 12 to facilitate sealing of the water jacket 4 around the lower end of the precombustion chamber device 2.

In operation when installed in a compression ignition engine, the described precombustion chamber device will receive atomized fuel through the tubular inlet conduit 20. Hot compressed gases will enter through the central bore of the outlet conduit 32. These combine in the precombustion chamber 24 where there is a minor explosion. This explosion consumes a relatively small percentage of the injected fuel, but it adds heat to the mixture and causes vaporization of the fuel. Expansion produced by the explosion will produce a rapid flow of the hot mixture through the outlet conduit 32.

The temperatures and gas flow encountered are sufficiently high that the outlet conduit 32 cannot be made of mild steel, but must be made of stainless steel or a similar heat and erosion-resistant material. A natural result of the hot gases flowing through the outlet conduit 32 is that the conduit itself becomes quite hot. The resultant expansion of conduit 32, however, does not have deleterious effect on any of the surrounding metallic chambers. The annular space 35 between members 32 and 34 permits appreciable expansion. It also prevents the convection of heat from members 32 to 34. The heat present in the outlet conduit 32 is instead conducted upwardly through the walls of the conduit and dissipated to the bottom wall 30 of the chamber. Thence, it goes to the water jacket where it is carried off and disposed of in a conventional manner.

It will be appreciated that the temperature of the exteriorly threaded tubular member 34 is significantly less than would be if gases flowed directly therethrough. The expansion of this member 34 is substantially the same as that of the lower wall 6 of the cylinder head. Therefore there is no tendency to crack the head due to different rates of thermal expansion of the various elements.

It is particularly important to note that the above mentioned characteristic is produced without sacrificing any convenience of threading a precombustion chamber device into the lower wall of an engine head. This greatly adds to the usefulness of the precombustion chamber device 2 in engines of conventional construction.

The precise dimensions of the precombustion chamber device will vary widely. In all installations, however, the spacing between the outlet conduit 32 and the threaded tubular member 34 should be at least 1/32 inch.

In one device which has performed well, the threaded tubular member 34 had an outside diameter of 1 1/16 inch and an inside diameter of 3/4 inch. The outlet conduit 32 had an outside diameter of 11/16 inch and an inside diameter of 5/16 inch. The diameter of the precombustion chamber was 2 inches, and its height was 1 1/4 inches.

Having only described a preferred embodiment of the invention, it is recognized that numerous modifications will occur to those skilled in the art. This invention encompasses any such modifications and its scope is delineated not by the foregoing disclosure but by the claims which follow.

I claim:

1. A precombustion chamber device capable of use with an internal combustion engine comprising, walls defining an enclosed precombustion chamber, one of said walls having an inlet to said precombustion chamber for connection to a fuel injecting device, a pair of concentric tubular members attached to one of said walls and extending outwardly from said precombustion chamber, said tubular members being spaced apart radially to define an annular space therebetween, the innermost said tubular member having a central bore in fluid communication with said precombustion chamber, and barrier means proximate to said precombustion chamber closing off direct fluid communication between said precombustion chamber and said annular space.

2. In an internal combustion engine of the compression ignition type, a cylinder head having an opening in a wall which defines in part an engine cylinder; a precombustion chamber device having a tubular extension member tightly engaged within said opening in the cylinder head; said precombustion chamber device having walls defining a precombustion chamber, said walls having an inlet opening to said precombustion chamber, a tubular outlet conduit in fluid communication with said precombustion chamber and constituting the sole opening between said precombustion chamber and the engine cylinder, said tubular outlet conduit extending through and spaced radially inwardly of said tubular member throughout that extent of said tubular extension member located within the wall of said cylinder head.

3. In an internal combustion engine of the compression ignition type, a cylinder head having an opening in a wall thereof which defines in part an engine cylinder, a precombustion chamber device having an exteriorly threaded tubular extension member threadedly engaged within said opening in said cylinder head, said precombustion chamber device having walls defining a precombustion chamber, said walls having an inlet opening to said precombustion chamber, a tubular outlet conduit in fluid communication with said precombustion chamber and constituting the sole opening between said precombustion chamber and the engine cylinder, said tubular outlet conduit extending through and spaced radially inwardly of said tubular member throughout that extent of said tubular extension member located within the wall of said cylinder head.

4. In an internal combustion engine of the compression ignition type, a cylinder head having a water jacket therewithin and an opening in a wall thereof which defines in part an engine cylinder, a precombustion chamber device with walls defining an enclosed precombustion chamber, one of said walls having an inlet opening, a fuel injecting device connected to said inlet opening for dispensing fuel into said precombustion chamber, a pair of concentric tubular members attached to one of said walls of said precombustion chamber device and extending outwardly from said precombustion chamber, said tubular members being spaced apart radially to define an annular space therebetween, the outermost said tubular member having threads engaged within said opening in said cylinder head wall, the innermost said tubular member having a central bore in fluid communication with said precombustion chamber, and barrier means spaced inwardly of the outermost ends of said tubular members to close off direct fluid communication between said precombustion chamber and said annular space.

5. The precombustion chamber device of claim 1, wherein the outermost of said concentric tubular members is exteriorly threaded, the threads terminating at said one of said walls in a shoulder lying in a plane radial to said threaded tubular member.

6. The precombustion chamber device of claim 1, wherein said barrier means comprises an outwardly flared portion at the one end of said innermost tubular member, said flared portion connecting said innermost tubular member to said one of said walls.

7. The precombustion chamber device of claim 3, wherein said tubular outlet conduit includes at the end in fluid communication with said precombustion chamber an outwardly flared portion which extends to said tubular extension member to close off one end of the space formed between said tubular extension and said tubular outlet conduit.

8. The precombustion chamber device of claim 4, wherein said innermost tubular member is attached to said one of said walls by means of an outwardly flared portion, said flared portion forming said barrier means.

9. The precombustion chamber device of claim 8, wherein said annular space is coextensive with the distance said concentric tubular members extend into said cylinder head wall.

10. A precombustion device capable of connection to the cylinder head of an internal combustion engine comprising, walls defining an enclosed precombustion chamber, an inlet to said chamber for connection to a source of fuel, an exteriorly threaded tubular extension member attached to one wall of said chamber and adapted to be threaded into an opening in said cylinder head, and a tubular outlet conduit extending through and spaced radially inwardly of said tubular extension member to form an annular space at least coextensive with the length of the threaded portion of said tubular extension member, whereby said annular space separates said tubular outlet conduit from said tubular extension member throughout the distance said extension member is threaded into said cylinder head, and barrier means for closing off one end of said annular space.

11. The precombustion chamber device of claim 10, wherein said tubular outlet conduit includes an outwardly flared portion which extends across said annular space to form said barrier means and to attach said tubular outlet conduit to said one wall of said chamber.

References Cited
UNITED STATES PATENTS

| | | | |
|---|---|---|---|
| 2,003,311 | 6/1935 | Ricardo | 123—32 |
| 2,058,827 | 10/1936 | Ricardo | 123—32 |
| 2,065,025 | 12/1936 | Ricardo | 123—32 |
| 2,066,228 | 12/1936 | Ricardo | 123—32 |
| 2,106,124 | 1/1938 | Ricardo | 123—32 |
| 2,112,787 | 3/1938 | Ricardo | 123—32 |
| 2,236,950 | 4/1941 | Ricardo | 123—32 |
| 2,804,858 | 9/1957 | Schilling | 123—32 |
| 2,853,060 | 9/1958 | Hockel | 123—32 |
| 2,972,987 | 2/1961 | Steidler | 123—32 |
| 2,977,941 | 4/1961 | Hockel | 123—32 |

LAURENCE M. GOODRIDGE, *Primary Examiner.*